United States Patent [19]

Milks

[11] Patent Number: 5,401,791
[45] Date of Patent: Mar. 28, 1995

[54] BOOKBINDING ADHESIVES; PROCESSES FOR PRODUCTION OF BOOKBINDING ADHESIVES; AND METHODS OF BOOKBINDING

[75] Inventor: Robert R. Milks, Baton Rouge, La.

[73] Assignee: Exxon Chemical Patents Inc., Linden, N.J.

[21] Appl. No.: 984,798

[22] Filed: Dec. 3, 1992

[51] Int. Cl.⁶ .................. C08L 23/08; C08L 33/08
[52] U.S. Cl. ........................ 524/270; 524/271; 524/272; 525/222; 525/227; 525/228; 525/229
[58] Field of Search ............. 524/270, 271, 272; 525/222, 228, 229, 227

[56] References Cited

U.S. PATENT DOCUMENTS

| | | | |
|---|---|---|---|
| 3,468,978 | 9/1969 | Rattersby | 525/222 |
| 3,615,106 | 10/1971 | Flanagan et al. | 525/222 |
| 3,926,878 | 12/1975 | Shimizu et al. | 524/271 |
| 3,929,938 | 12/1975 | White et al. | 525/149 |
| 4,129,539 | 12/1978 | Fakla et al. | 524/272 |
| 4,140,733 | 2/1979 | Meyer, Jr. et al. | 524/271 |
| 4,167,433 | 9/1979 | Lakshmanan | 524/271 |
| 4,769,406 | 9/1988 | Keithley | 524/271 |
| 4,960,295 | 10/1990 | Bodouroglou | 412/5 |
| 5,126,176 | 6/1992 | Blaskovitz et al. | 525/221 |

FOREIGN PATENT DOCUMENTS

| | | | |
|---|---|---|---|
| 0001877 | 5/1979 | European Pat. Off. | C09J 3/14 |
| 0047932A1 | 9/1981 | European Pat. Off. | . |
| 0203251A2 | 1/1986 | European Pat. Off. | . |
| 0038247 | 3/1984 | Japan | 525/222 |
| 0852920 | 8/1981 | U.S.S.R. | 525/222 |

*Primary Examiner*—Paul R. Michl
*Assistant Examiner*—Olga Asinovsky
*Attorney, Agent, or Firm*—T. D. Simmons; D. W. Miller

[57] ABSTRACT

It has been discovered that certain hot melt adhesive formulations can be produced which exhibit superior lay-flat properties when used as bookbinding adhesives. The formulations incorporate copolymers of ethylene and unsaturated esters. The resulting bookbinding adhesives have viscosities of 2,000 to 8,000 cps at 177° C. The bookbinding adhesives are found to impart lay-flat properties to books when the adhesives have a tensile to elongation ratio of ≦1.45.

23 Claims, No Drawings

BOOKBINDING ADHESIVES; PROCESSES FOR PRODUCTION OF BOOKBINDING ADHESIVES; AND METHODS OF BOOKBINDING

BACKGROUND OF INVENTION

The present invention relates to new improved adhesives for binding books and related articles and the production of such adhesives. In particular, the adhesives which are the subject of the present invention relate to hot melt adhesives utilized in both "perfect binding" and "traditional" bookbinding processes.

Although they are distinctly different processes, adhesives are used in both traditional and perfect binding bookbinding. In traditional bookbinding, adhesives are employed in many different steps. In a step referred to as "gluing-off", adhesive is used in addition to thread or wire to bind and seal pages of a book together. In a step referred to as "lining" adhesive is used to attach reinforcing material, such as cloth or paper, to the book spine In a step referred to as "casing-in", adhesive is used to attach the book's cover to the book spine.

In perfect binding, adhesive alone is used to bind the pages of a book together and attach the book's cover. If only one adhesive application is used to construct a book, it is called a "one-shot process". When two adhesive applications are used, it is called a "two-shot process". In the two shot process, the first application of adhesive binds the pages of the book together. This adhesive is referred to as a primer glue. The second application of adhesive is used to attach the book's cover to the book spine. This adhesive is referred to as a cover glue.

Adhesives used in the above processes fall into two general categories, water-based emulsion adhesives and hot melt adhesives. Water-based emulsion bookbinding adhesives are most often based on vinyl acetate ethylene (VAE) copolymers, but some are based on vinyl acetate (VA) homopolymer. These water-based adhesives are most often used in the traditional process steps of gluing-off and for casing-in edition (hardcover) books. VAE copolymer based water-based adhesives are also used as primer glue in two-shot perfect binding, especially when the cover glue is a hot melt adhesive based on styrenic block copolymers.

Hot melt bookbinding adhesives are most often based on ethylene vinyl acetate (EVA) copolymers. Other hot melt bookbinding adhesive polymers are polyurethanes (PUR) and styrenic block copolymers (SBC). Because they are fast setting, EVA hot melt adhesives are ideal for high speed operations (one-shot) such as perfect binding bookbinding. EVA based hot melt adhesives can be employed as primer and/or cover glue in two-shot perfect binding. As mentioned above, SBC based hot melt adhesives require the use of water-based primer glue to improve its adhesion to the book spine. SBC based hot melt adhesives are often used in the manufacture of rounded spine edition books. PUR based hot melt adhesives are special in that they "cure" with water over time creating a very durable product. PUR hot melts are finding growing use in the manufacture of textbooks.

In hot melt bookbinding adhesives, one function of the polymers mentioned above is to provide strength and flexibility to the adhesive. In this regard, high molecular weight polymers used in hot melt adhesives are often referred to as backbone polymers. These polymers also affect the adhesive's ability to adhere to a given type of paper or other surface. This impact on adhesive performance is greatly influenced by polymer molecular weight and the kind and amount of chemical functionality a polymer possess.

For the above reasons, copolymers of ethylene and unsaturated esters are the most commonly used polymers in bookbinding adhesives. In water-based bookbinding adhesives, VAE copolymers are most often used. In hot melt bookbinding adhesives, EVA copolymers are most frequently employed. In both types of adhesives, ethylene polymer segments impart flexibility while pendant ester (acetate) groups yield an amorphous and chemically functional polymer which are necessary attributes for good adhesion.

Because of their high molecular weight, backbone adhesive polymers cannot be used as the sole component of a hot melt adhesive. Not only are their melt viscosities too high to be useful in bookbinding applications, but their adhesion to paper and other substrates is less than desirable. The most effective way to reduce the melt viscosity of adhesive polymers is with wax(es). These low molecular weight polyethylene homo- and/or copolymers enhance and modify other adhesive properties such as service temperature performance, set-time, cohesive strength, and flexibility. One adhesive property diminished by the addition of wax(es) is adhesion.

Another standard hot melt adhesive ingredient which reduces the melt viscosity of backbone adhesive polymers is tackifier. Although these low molecular weight polymers and resins are not quite as effective as wax(es) in reducing melt viscosity, properly selected tackifiers can do so while simultaneously enhancing both the adhesion and flexibility of hot melt adhesives.

Melt viscosity is but one of many hot melt adhesive properties and/or characteristics that determine if an adhesive is useful in bookbinding. In addition to melt viscosity, important adhesive properties are set-time, cohesive strength, adhesive strength to various substrates, service temperature performance, adhesive flexibility, and adhesive extensibility. However, ultimate performance properties of a book do not solely depend on adhesive performance. The materials and method used in construction of a book are important factors as well.

Important performance properties of books include page-pull, lay-flat, page-flex, cold crack, easy-open, and spine flexibility. Page-pull refers to the force required to pull an individual page from a bound book. Page-pull depends on both the adhesive and surface preparation of the book block. Lay-flat refers to a characteristic of a book to remain open at a given page and how flat it lies (spine up or down). Lay-flat depends on the characteristics of the adhesive and the amount of adhesive applied. Page-flex is a complex function of adhesive characteristics, penetration of the adhesive into the book block, and surface preparation of the book block. Cold crack refers to the temperature at which the spine of a book will crack when it is quickly opened so that its covers touch. Cold crack depends on the adhesive and the amount of adhesive applied. Easy-open refers to the amount of resistance a book offers when it is first opened. Easy-open depends on adhesive characteristics and amount of adhesive applied. Spine flexibility refers to the ability of a book to be opened repeatedly without the spine creasing or wrinkling. Spine flexibility is a function of adhesive properties and amount of adhesive applied.

As with most adhesives, the desired end result is to formulate an adhesive which imparts a good balance of these performance properties. Often bookbinding adhesives are developed to enhance one particular bookbinding property. To be useful, however, these adhesives cannot be too deficient in any one of the performance properties mentioned above.

SUMMARY OF THE INVENTION

It has been discovered that certain hot melt adhesive formulations can be produced which exhibit superior lay-flat properties when used as bookbinding adhesives. The formulations are comprised of a copolymer of ethylene and an unsaturated ester or blends of ethylene and unsaturated ester copolymers. The resulting bookbinding adhesives have viscosities of 2,000 to 8,000 cps at 177° C. The bookbinding adhesives may be comprised of 20 to 65 weight percent of ethylene and unsaturated ester copolymer(s), 20 to 60 weight percent of a tackifier and 10 to 20 weight percent of a modifier, such as a wax.

The adhesive formulations in accordance with the present invention impart superior lay flat properties to books while also maintaining good values for other properties important in bookbinding. The adhesive formulations are useful in traditional and perfect bookbinding processes utilizing one-shot and two-shot adhesive applications.

DETAILED DESCRIPTION OF THE INVENTION

This invention relates to bookbinding adhesives, their use, and production. For purposes of convenience, the word "bookbinding" will be used to describe the process by which books are produced. However, this invention is not limited to adhesives suitable for binding only books. As used herein the term "books" is intended to include other articles containing pages bound with adhesives such as paperback books, soft cover books, instruction manuals, magazines, catalogs, trade journals, directories, and the like. The bookbinding adhesives in accordance with the present invention fall into three categories: 1) those containing one or more ethylene alkyl acrylate backbone copolymers, 2) those containing one or more ethylene alkyl acrylate backbone copolymers and one or more ethylene vinyl acetate backbone copolymers, and 3) those containing one or more ethylene vinyl acetate backbone copolymers whose single or combined melt index exceeds 400.

Adhesives which fall into the first category in accordance with the present invention are comprised of 20 to 65 weight percent of one or more ethylene alkyl acrylate backbone copolymers. In the preferred embodiment, adhesives are comprised of 30 to 50 weight percent of two or more ethylene alkyl acrylate backbone copolymers. A first copolymer or blend of copolymers has a melt index of 1 to 30 and a second copolymer or blend of copolymers has a melt index of 150 to 600. The low melt index copolymer or copolymer blend comprises 15 to 50 weight percent of the backbone copolymer and the high melt index copolymer or copolymer blend comprises 50 to 85 weight percent of the backbone copolymer. For ease of reference, "copolymer material(s)" hereinafter refers to copolymers and blends of copolymers collectively.

These copolymer materials are blended with one or more tackifiers and one or more modifiers, such as a wax, to yield a formulation having 25 to 45 weight percent tackifier and 10 to 20 weight percent wax. The components are blended to yield an adhesive having a viscosity of 2,000 to 8,000 cps at 177° C.

Preferred copolymers are copolymers of ethylene and methyl, ethyl, butyl and higher alkyl acrylates with ethylene methyl acrylates being the most preferred. The alkyl acrylate content of the copolymers is preferably 20 to 45 mole percent.

Suitable tackifiers for use in this preferred type of adhesive of the first category in accordance with the present invention include glycerol and pentaerythritol esters of natural and modified rosins (gum rosin, wood rosin, tall-oil rosin, distilled rosin, polymerized rosin, etc.), aromatic and aromatic modified aliphatic petroleum-based hydrocarbon resins, and phenolic modified and styrenated terpene resins. The choice of tackifier depends upon the mole percent content of the alkyl acrylates incorporated in the copolymers. As a general rule, the lower the acrylate content, the stronger the preference for a polar tackifier such as rosin or wood rosin esters. Conversely, the higher the ester content, the stronger the preference for a relatively non-polar tackifier such as styrenated terpenes and aliphatic-/aromatic petroleum resins. Selecting the proper tackifier as a component of a bookbinding adhesive is critical from the standpoint of adhesive properties and book performance properties. In general, the components of a bookbinding adhesive must be compatible if the adhesive is to be useful. In contrast to EVA backbone copolymers, it has been discovered that more care must be taken in selecting tackifiers for ethylene alkyl acrylate backbone copolymers. When proper tackifiers are selected, adhesives in accordance with the present invention display good cohesive (tensile) strength, good flexibility, and good extensibility. These properties have been found to contribute significantly to book performance properties such as lay-flat and page-pull.

Suitable viscosity modifiers for use in this first type of adhesive in accordance with the present invention include paraffinic, paraffinic micro-crystalline, functionalized, and/or Fischer-Tropsch waxes.

In another embodiment of the first category, bookbinding adhesives are comprised of 20 to 35 weight percent of a low melt index ethylene alkyl acrylate backbone copolymer material having a melt index of 1 to 10 and an alkyl acrylate content of 20 to 38 mole percent. The low melt index ethylene alkyl acrylate backbone copolymer material based adhesive is also comprised of 40 to 60 weight percent of a tackifier and 10 to 20 weight percent of a modifier such as a paraffinic, paraffinic micro-crystalline, functionalized and/or Fischer-Tropsch waxes. The preferred low melt index ethylene alkyl acrylate copolymer material based adhesive is comprised of 20 to 30 weight percent of ethylene alkyl acrylate backbone copolymer material having a melt index of 3 to 7 and containing 28 to 35 mole percent methyl acrylate. The preferred formulation is comprised of 50 to 55 weight percent tackifier such as glycerol and pentaerythritol esters of natural and modified rosins (gum rosin, wood rosin, tall oil rosin, distilled rosin, polymerized rosin, etc.), aromatic and aromatic modified aliphatic hydrocarbon resins, and phenolic modified and styrenated terpene resins. A modifier is present in a preferred range of 15 to 20 weight percent and is selected from a group consisting of paraffinic, micro-crystalline, functionalized, and/or Fischer-Tropsch waxes. The formulation will have a viscosity in the range of 2,000 to 8,000 cps at 177° C.

Another embodiment of the first category of adhesives incorporates a high melt index ethylene alkyl acrylate copolymer material. The adhesives are comprised of 45 to 65 weight percent copolymer material having melt indices of 200 to 600 and having a 23 to 38 mole percent alkyl acrylate content. The high melt index alkyl acrylate copolymer material based adhesives are comprised of 20 to 40 weight percent tackifier and 10 to 20 weight percent modifier.

The preferred high melt index alkyl acrylate copolymer material based formulation is comprised of 50 to 60 weight percent copolymer material having a melt index of 270 to 450 with an alkyl acrylate content of 25 to 35 mole percent with the preferred alkyl acrylate being methyl acrylate. The preferred high melt index ethylene alkyl acrylate copolymer material based formulation is comprised of 25 to 35 weight percent tackifier of the same type disclosed as preferred with the low melt index ethylene alkyl acrylate based adhesives and 10 to 20 weight percent wax of the types disclosed for the low melt index ethylene alkyl acrylate copolymer material based adhesives.

The second category of adhesives in accordance with the present invention are comprised of 30 to 50 weight percent of one or more ethylene alkyl acrylate backbone copolymers and one or more EVA backbone copolymers. In this category, one of the copolymers or blend of copolymers has a melt index of 1 to 30 and the other copolymer or blend of copolymers has a melt index of 150 to 600. The low melt index copolymer or copolymer blend comprises 15 to 50 weight percent of the backbone copolymer and the high melt index copolymer or copolymer blend comprises 50 to 85 percent of the backbone copolymer.

These copolymers are blended with one or more tackifiers and one or more waxes to yield a formulation having 25 to 45 weight percent tackifier and 10 to 20 weight percent wax. The components are blended to yield an adhesive having a viscosity of 2,000 to 8,000 cps at 177° C.

Preferred polymers for the low melt index copolymer or copolymer blend are ethylene alkyl acrylate backbone copolymers containing 20 to 45 mole percent alkyl acrylate. Preferred polymers for the high melt index copolymer or copolymer blend are both EVA copolymers containing 20 to 50 mole percent vinyl acetate and ethylene alkyl acrylate copolymers containing 20 to 45 mole percent alkyl acrylate. In this embodiment, tackifiers and waxes are selected from the same types specified for category one adhesives.

Adhesives of the third category in accordance with the present invention are comprised of 40 to 65 weight percent of an EVA copolymer or blends of EVA copolymers having a melt index >400 and ≦600 and a vinyl acetate content of 29 to 50 mole percent. Suitable tackifiers are the same as disclosed for the low melt index ethylene alkyl acrylate copolymer material based formulations and are present in the amount of 20 to 40 weight percent. These formulations are also comprised of 10 to 20 weight percent of a modifier such as the waxes disclosed for the low melt index ethylene alkyl acrylate copolymer material based adhesives. The preferred formulations for the high melt index ethylene vinyl acetate copolymer material based formulations are 50 to 60 weight percent copolymer having a melt index of 425 to 550 and a 23 to 38 mole percent vinyl acetate content. The preferred formulations are comprised of 25 to 35 weight percent tackifier and 10 to 20 weight percent wax modifier.

One of the most important properties of books is lay-flat. This is especially the case with softcover books such as instruction manuals, computer manuals, and trade journals which are typically bound using the perfect binding process. When using these types of softcover books, the reader desires the book to remain open to a particular page without having to use one of their hands or other objects to prevent the page from turning to another or the book closing.

In general, adhesives containing EVA backbone copolymers do not impart good lay-flat properties to books. Books produced with these adhesives often have a tendency to snap shut even after the spine of the book is "worked" with successive openings and closings. In addition, books produced with these adhesives develop permanent wrinkles in the book spine with continued use which is also undesirable.

In contrast with typical adhesives containing EVA backbone copolymers, adhesives in accordance with the present invention impart superior lay-flat properties to books. Books produced with these adhesives do not have a tendency to snap shut and show better lay-flat with increased usage of the book. Furthermore, books produced with these adhesives do not develop wrinkles in the spine with continued use.

Often in the production of books containing pages made from coated or glossy paper, a two-shot adhesive system is used. Given that books with equal performance properties and characteristics are produced, a one-shot adhesive system is preferred by book binders over a two-shot adhesive system. This is especially true when one or both adhesives used in the two-shot system are water-based VAE backbone adhesives. The reasons for this preference are 1) the one-shot hot melt adhesive system is a faster process, 2) the one-shot hot melt adhesive system does not require a cooling or drying zone on the binder as a two-shot hot melt adhesive system and water-based system, respectively, require, 3) the one-shot hot melt adhesive system allows faster adhesive change-over for the production of different books than a two-shot adhesive system, 4) a one-shot adhesive system requires significantly less equipment than a two-shot adhesive system, e.g. one less glue pot, and 5) the one-shot hot melt adhesive system allows books to be inspected shortly after production compared to waiting twenty-four (24) hours to inspect books produced using a two-shot adhesive system which uses water-based adhesives exclusively.

Traditionally EVA backbone copolymer based adhesives usually require the use of a two-shot systems when books containing pages made from coated and glossy pages are produced. If these adhesives are employed using a one-shot adhesive system, books are likely to be deficient in page-pull performance. The adhesives in accordance with the present invention produce books with superior page-pull in one-shot as well as multiple step methods.

Lay-flat properties depend both on adhesive properties/characteristics and the amount of adhesive (thickness of adhesive) applied to the spine of the book. Of these, adhesive properties/characteristics appear to be more important. However, no one adhesive property/characteristic is predictive of whether an adhesive will produce a book with good lay-flat or not. This indicates that an adhesive's contribution to lay-flat performance is the result of two or more adhesive properties acting simultaneously. Two important properties/characteristics that contribute to lay-flat are extensibility and cohesive strength. Each of these properties/characteristics depends on the type, amount, and compatibility of each component in the adhesive.

As used here, extensibility is equal to the change in length of an adhesive test specimen when subjected to an applied stress at a constant rate of stress. Although they are not the same, extensibility is closely related to strain which is a measure of the deformation of the sample. Extensibility is measured in units of percent (%) and is referred to as elongation. The cohesive strength of an adhesive is equal to the force required to pull an adhesive test specimen apart. Cohesive strength is measured in units of pounds per square inch (psi) and is referred to as tensile strength.

In order to better quantify lay-flat differences between adhesives, we have found that a ratio of average tensile strength at which an adhesive's test specimens break to the average elongation at which the break occurs ($\sigma/\epsilon$) is useful.

It has been discovered that the level of lay-flat performance imparted to books using adhesives in accordance with the present invention depends simultaneously on tensile to elongation ratio ($\sigma/\epsilon$), and the type(s) of backbone polymers employed. To impart superior lay-flat properties to books, adhesives in accordance with the present invention have a preferred $\sigma/\epsilon$ of $\leq 1.45$ The more preferred $\sigma/\epsilon$ ratio is $\leq 1.25$. The most preferred $\sigma/\epsilon$ ratio is $\leq 0.90$. Meeting these criteria can be achieved in accordance with the present invention while maintaining other adhesive properties that are important in bookbinding.

The present invention is further illustrated by the following examples and discussions, although it is understood that these examples are included for the purposes of illustration and are not intended to limit the scope of the invention.

EXAMPLES 1 THROUGH 3 (TABLE I)

Example 1 is a category 1 type hot melt bookbinding adhesive in accordance with the current invention. It contains two EMA backbone copolymers, XS-93.04 and OPTEMA TM TC-120 (available from Exxon Chemical Company). XS-93.04 contains approximately twenty-two weight percent methyl acrylate and has a nominal melt index of 270 (ASTM D-1238). Of commercially available EMA backbone copolymers, it has the highest melt index. OPTEMA TC-120 contains approximately twenty-one weight percent methyl acrylate and has a nominal melt index of 6 (ASTM D-1238).

Example 1 also contains a tall-oil rosin ester tackifier (PERMALYN 3100 available from Hercules, Inc.), a paraffinic wax (ARISTOWAX 165 available from Unocal), and an anti-oxidant (IRGANOX 1010 available from Ciba-Geigy). As with other adhesive examples, all components were melt blended in a large beaker equipped with a heating mantle at 177° C. until homogeneous.

Comparative Examples 2 and 3 are hot melt bookbinding adhesives which contain only EVA backbone copolymers. Example 2 utilizes the same formulating strategy as Example 1, i.e., both low melt index and high melt index backbone polymer components are used. ESCORENE TM UL7720 (available from Exxon Chemical Company) contains approximately twenty-eight weight percent vinyl acetate and has a nominal melt index of 190 (ASTM D-1238). ESCORENE UL7760 (available from Exxon Chemical Company) also contains approximately twenty-eight weight percent vinyl acetate and has a nominal melt index of 5.7 (ASTM D-1238). Example 2 also contains PERMALYN 3100 tackifier, ARISTOWAX 165 wax, and IRGANOX 1010 anti-oxidant. Example 3 is a commercially available EVA based hot melt bookbinding adhesive.

Books have been bound on a perfect binder using a one-shot adhesive application of Example 1 and Example 3. This perfect binder was equipped with a two wheel adhesive applicator, and the adhesive application temperature was between 350° and 400° F. Book blocks, stacks of pages that form the contents of a book, consisted of uncoated paper and were appropriately roughed and notched prior to the application of adhesive. Laboratory books have also been produced with Examples 1, 2 and 3 as well as other adhesives described below. These laboratory books were prepared with smooth book blocks and contained either uncoated or coated paper.

It has been found that books produced with Example 1 have superior lay-flat properties compared to books produced with Examples 2 or 3. Comparing properties of these three adhesives, it can be seen that Example 1 has greater extensibility (% elongation) and a much lower $\sigma/\epsilon$ ratio than those of Examples 2 and 3. Since Example 1 imparts superior lay-flat to laboratory books compared to those produced using Example 2, the importance of simultaneously having a low $\sigma/\epsilon$ ratio and greater extensibility becomes apparent.

Books produced with Example 1 are further distinguished from those produced using Examples 2 and 3 in four other ways. First, books produced with Example 1 have less of a tendency to snap-shut compared to books produced with Examples 2 and 3. Second, the lay-flat of books produced with Example 1 actually improves as the spine is worked with continual use. This is not seen with typical EVA based hot melt adhesives. Third, the spines of books produced with Example 1 do not develop wrinkles with continued use. Spines of books produced with typical EVA based hot melt adhesives develop permanent wrinkles with continual use. Fourth, the page-pull determined on laboratory books containing coated paper and bound with Example 1 was more than twice as great as page-pulls on laboratory books containing coated paper and bound with Example 3. This indicates that Example 1 adhesive is useful in one-shot perfect binding of books containing difficult to adhere to paper substrates.

Books containing uncoated paper and bound with Example 1 showed the above improvements in lay-flat while maintaining other important properties. These books well exceeded the minimum performance requirements for page-pull (3 pounds per linear inch), page-flex (>400 flexes), and cold crack (<45° F.).

EXAMPLES 4 THROUGH 6 (TABLE II)

As with Example 1, Examples 4 and 5 each contain two EMA backbone copolymers, XS-93.04 and XS-55.08 (available from Exxon Chemical Company). In contrast to OPTEMA TC-120 used in Example 1, XS-55.08 has a significantly higher methyl acrylate content. OPTEMA XS-55.08 contains approximately twenty-seven weight percent methyl acrylate and has a nominal melt index of 5 (ASTM D-1238). Examples 4 and 5 also contain an aromatic modified aliphatic hydrocarbon tackifier (ESCOREZ 2393 available from Exxon Chemical Company), wax, and an anti-oxidant.

Formula 4 has a lower backbone polymer content and higher tackifier content than Example 1. The primary effect of this formulation change is to lower viscosity into a more desirable application viscosity range. Example 4 has similar extensibility and a lower $\sigma/\epsilon$ ratio. Example 5 demonstrates that a minor adjustment in the ratio of the EMA backbone polymers yields an adhesive with even greater extensibility than Example 1.

Example 6 contains EVA backbone copolymers at the same concentration as Example 4. As seen in the comparison between Example 1 and Example 2, the adhesive containing EMA backbone copolymers (Example 4) has greater extensibility and a lower $\sigma/\epsilon$ ratio than the adhesive containing EVA backbone copolymers (Example 6).

EXAMPLES 7 THROUGH 10 (TABLE III)

Examples 7 through 10 are presented to demonstrate differences between adhesives based on single low melt index EVA backbone copolymers and adhesives based on single low melt index ethylene acrylate backbone copolymers.

Comparative example 7 contains ESCORENE UL7760 which, as described above, contains approximately twenty-eight weight percent vinyl acetate and has a nominal melt index of 5.7. Example 8 contains XS-55.08 which, as described above, contains approximately twenty-seven weight percent methyl acrylate and has a nominal melt index of 5. Given that each of these backbone copolymers contains similar mole percentages of functional monomers, which are isomers of one another, and that these backbone copolymers have similar melt indices, it is surprising and unexpected that Example 8 has such a different $\sigma/\epsilon$ ratio than that of Example 7 at equivalent extensibilities.

Example 9 contains OPTEMA TC-120 which, as described above, contains approximately twenty-one weight percent methyl acrylate and has a nominal melt index of 6. Example 10 contains DPD-6169 (available from Union Carbide Chemical Company) which is an ethylene ethyl acrylate (EEA) backbone copolymer. It contains approximately eighteen weight percent ethyl acrylate and has a nominal melt index of 6 (ASTM D-1238). Even with considerably lower functional monomer content, these backbone copolymers yield adhesives with significantly lower $\sigma/\epsilon$ ratios than Example 7. One would expect if the ethyl acrylate monomer content were increased the $\sigma/\epsilon$ ratio could be reduced to a more desirable value.

EXAMPLES 11 THROUGH 13 (TABLE IV)

Examples 11 through 13 show properties of adhesives containing high melt index backbone polymers. Example 11 contains two EVA backbone copolymers, ESCORENE UL7720 and UL7710. ESCORENE UL7710 (available from Exxon Chemical Company) contains approximately twenty-eight weight percent vinyl acetate and has a nominal melt index of 510. The ratio of backbone copolymers used in Example 11 was selected to yield a backbone polymer with a melt index of approximately 400. Example 12 contains one EVA (UL7710) and one EMA (XS-93.04) backbone copolymer. As for Example 11, the ratio of backbone copolymers used in Example 12 was selected to yield a backbone polymer with the melt index of approximately 400. Example 13 contains only UL7710 as the backbone polymer.

It is surprising these adhesives are not brittle and meet the characteristics expected of adhesives that impart superior lay-flat to books, i.e., good extensibility and low $\sigma/\epsilon$ ratio. As seen in other examples, Example 12, containing the EMA copolymer, has better extensibility and lower $\sigma/\epsilon$ ratio than Example 11 which contains only EVA backbone copolymers.

EXAMPLES 14 AND 15 (TABLE V)

Examples 14 and 15 show the properties of adhesives containing two ethylene acrylate backbone copolymers. As mentioned above, XS-55.08 is an EMA backbone copolymer. ENATHENE 89822 (available from Quantum Chemical Company) is an ethylene normal-butyl acrylate (EnBA) backbone copolymer. It contains approximately thirty-five weight percent normal-butyl acrylate and has a nominal melt index of 400.

These two examples show that an EnBA backbone copolymer can be substituted for an EMA backbone copolymer and yield an adhesive that is distinctly different from EVA based adhesives but similar to EMA based adhesives, i.e., good extensibility and low $\sigma/\epsilon$ ratios.

EXAMPLES 16 AND 17 (TABLE VI)

Examples 16 and 17 show that substituting EMA backbone copolymers for a portion of EVA backbone copolymers in an adhesive formula yields an adhesive with a lower $\sigma/\epsilon$ ratio. These results indicate that adhesives containing both EVA backbone copolymer and EMA (or other) backbone copolymer are useful to impart better lay-flat performance to books than an EVA backbone based adhesive.

TABLE I

Hot Melt Bookbinding Adhesives
Adhesives Containing EVA Backbone Copolymers
Compared to
Adhesive Containing EMA Backbone Copolymers

| | Examples: | | |
|---|---|---|---|
| | 1 | 2 | 3 |
| XS-93.04 | 27 | — | |
| OPTEMA TC-120 | 18 | — | Commercial |
| ESCORENE UL7720 | — | 29.25 | EVA |
| ESCORENE UL7760 | — | 15.75 | Hot Melt |
| PERMALYN 3100 | 35 | 35 | Bookbinding |
| ARISTOWAX 165 | 20 | 20 | Adhesive |
| IRGANOX 1010 | 0.5 | 0.5 | |
| Properties: | | | |
| Viscosity[1], cps | 6490 | 6425 | 3515 |
| Tensile[2], psi | 635 | 1135 | 940 |
| Elongation[2], % | 725 | 675 | 560 |
| $\sigma/\epsilon^3$ | 0.88 | 1.68 | 1.68 |

[1] @ 177 C. (350 F.)
[2] 0.25" wide test specimens
[3] ratio of average tensile to average elongation at break

TABLE II

Hot Melt Bookbinding Adhesives
Adhesives Containing EMA Backbone Copolymers
Compared to
Adhesive Containing EVA Backbone Copolymers

| | Examples: | | |
|---|---|---|---|
| | 4 | 5 | 6 |
| XS-93.04 | 26 | 28 | — |
| XS-55.08 | 14 | 12 | — |
| ESCORENE UL7720 | — | — | 26 |
| ESCORENE UL7760 | — | — | 14 |

TABLE II-continued

Hot Melt Bookbinding Adhesives
Adhesives Containing EMA Backbone Copolymers
Compared to
Adhesive Containing EVA Backbone Copolymers

| | Examples: | | |
|---|---|---|---|
| | 4 | 5 | 6 |
| ESCOREZ 2393 | 40 | 40 | 40 |
| ARISTOWAX 165 | 20 | 20 | 20 |
| IRGANOX 1010 | 0.5 | 0.5 | 0.5 |
| Properties: | | | |
| Viscosity[1], cps | 3525 | 3150 | 4225 |
| Tensile[2], psi | 560 | 565 | 750 |
| Elongation[2], % | 720 | 780 | 670 |
| $\sigma/\epsilon^3$ | 0.78 | 0.72 | 1.11 |

[1] @ 177 C. (350 F.)
[2] 0.25" wide test specimens
[3] ratio of average tensile to average elongation at break

TABLE III

Hot Melt Bookbinding Adhesives
Low Melt Index Backbone Polymer Adhesive Comparisons

| | Examples: | | | |
|---|---|---|---|---|
| | 7 | 8 | 9 | 10 |
| ESCORENE UL7760 | 27.5 | — | — | — |
| XS-55.08 | — | 27.5 | — | — |
| OPTEMA TC-120 | — | — | 30 | — |
| DPD-6169 | — | — | — | 30 |
| PERMALYN 3100 | 52.5 | 52.5 | 50 | 50 |
| ARISTOWAX 165 | 20 | 20 | 20 | 20 |
| IRGANOX 1010 | 0.5 | 0.5 | 0.5 | 0.5 |
| Properties: | | | | |
| Viscosity[1], cps | 5140 | 5240 | 5640 | 4965 |
| Tensile, psi | 1340[2] | 860[2] | 750[3] | 860[3] |
| Elongation, % | 600[2] | 600[2] | 535[3] | 455[3] |
| $\sigma/\epsilon^4$ | 2.23 | 1.43 | 1.40 | 1.90 |

[1] @ 177 C. (350 F.)
[2] 0.25" wide test specimen
[3] 0.5" wide test specimen
[4] ratio of average tensile to average elongation at break

TABLE IV

Hot Melt Bookbinding Adhesives
High Melt Index Backbone Polymer Adhesives Comparisons

| | Examples: | | |
|---|---|---|---|
| | 11 | 12 | 13 |
| ESCORENE UL7720 | 15 | — | — |
| ESCORENE UL7720 | 45 | 36 | 65 |
| XS-93.04 | — | 24 | — |
| PERMALYN 3100 | 25 | 25 | 23 |
| ARISTOWAX 165 | 15 | 15 | 12 |
| IRGANOX 1010 | 0.5 | 0.5 | 0.5 |
| Properties: | | | |
| Viscosity[1], cps | 4225 | 4215 | 4750 |
| Tensile[2], psi | 690 | 455 | 575 |
| Elongation[2], % | 835 | 910 | 930 |
| $\sigma/\epsilon^3$ | 0.83 | 0.50 | 0.62 |

[1] @ 177 C. (350 F.)
[2] 0.25" wide test specimens
[3] ratio of average tensile to average elongation at break

TABLE V

Hot Melt Bookbinding Adhesives
Adhesives Containing EMA and EnBA Backbone Copolymers

| | Examples: | |
|---|---|---|
| | 14 | 15 |
| ENATHENE 89822 | 24 | 26 |
| XS-55.08 | 16 | 14 |
| ESCOREZ 2393 | 40 | 45 |
| ARISTOWAX 165 | 20 | 15 |
| IRGANOX 1010 | 0.5 | 0.5 |
| Properties: | | |
| Viscosity[1], cps | 3245 | 3365 |
| Tensile[2], psi | 435 | 450 |
| Elongation[2], % | 955 | 870 |
| $\sigma/\epsilon^3$ | 0.46 | 0.52 |

[1] @ 177 C. (350 F.)
[2] 0.25" wide test specimens
[3] ratio of average tensile to average elongation at break

TABLE VI

Hot Melt Bookbinding Adhesives
Adhesives Containing Both EMA and EVA Backbone Copolymers

| | Examples: | |
|---|---|---|
| | 16 | 17 |
| XS-93.04 | 24 | — |
| ESCORENE UL7720 | — | 24 |
| OPTEMA TC-120 | — | 16 |
| ESCORENE 7760 | 16 | — |
| PERMALYN 3100 | 40 | 40 |
| ARISTOWAX 165 | 20 | 20 |
| IRGANOX 1010 | 0.5 | 0.5 |
| Properties: | | |
| Viscosity[1], cps | 4550 | 4890 |
| Tensile[2], psi | 845 | 815 |
| Elongation[2], % | 680 | 690 |
| $\sigma/\epsilon^3$ | 1.24 | 1.18 |

[1] @ 177 C. (350 F.)
[2] 0.25" wide test specimens
[3] ratio of average tensile to average elongation at break While the present invention has been described and illustrated by reference to particular embodiments and examples, it will be appreciated by those of ordinary skill in the art that the invention lends itself to variations not necessarily illustrated herein.

What is claimed is:

1. A bookbinding adhesive comprised of 30 to 50 weight percent of an ethylene unsaturated ester copolymer component comprised of a first ethylene unsaturated ester copolymer material having a melt index of 1 to 30 and a second ethylene unsaturated ester copolymer material having a melt index of 150 to 600 wherein said bookbinding adhesive has a viscosity of 2,000 to 8,000 cps at 177° C. and a ratio of average tensile at break to average elongation at break $\leq 1.45$.

2. A bookbinding adhesive in accordance with claim 1 wherein said ethylene unsaturated ester copolymer component is comprised of 15 to 50 weight percent of said first ethylene unsaturated ester copolymer material and 50 to 85 weight percent of said second ethylene unsaturated ester copolymer material.

3. A bookbinding adhesive in accordance with claim 1 wherein said first and second ethylene unsaturated ester copolymer materials are ethylene alkyl acrylate copolymer materials.

4. A bookbinding adhesive in accordance with claim 3 wherein said first and second copolymer materials are comprised of at least one copolymer selected from the group consisting of ethylene methyl acrylate, ethylene ethyl acrylate and ethylene butyl acrylate.

5. A bookbinding adhesive in accordance with claim 4 wherein said first and second copolymer materials have an alkyl acrylate content of 20 to 45 mole percent.

6. A bookbinding adhesive in accordance with claim 5 further comprised of 25 to 45 weight percent of a tackifier and 10 to 20 weight percent of a wax.

7. A bookbinding adhesive comprised of 20 to 35 weight percent of an ethylene alkyl acrylate copolymer material having a melt index of 1 to 10; 40 to 60 weight percent of a tackifier; and 10 to 20 weight percent of a wax wherein said bookbinding adhesive has a viscosity of 2,000 to 8,000 cps at 177° C. and a ratio of average tensile at break to average elongation at break $\leq 1.45$.

8. A bookbinding adhesive in accordance with claim 7 wherein said ethylene alkyl acrylate copolymer material is comprised of ethylene methyl acrylate having a melt index of 3 to 7 with a methyl acrylate content of 28 to 35 mole percent.

9. A bookbinding adhesive comprised of 20 to 35 weight percent of an ethylene alkyl acrylate copolymer material having a melt index of 1 to 10; 40 to 60 weight percent of a tackifier; and 10 to 20 weight percent of a wax wherein said bookbinding adhesive has a viscosity of 2,000 to 8,000 cps at 177° C. and a ratio of average tensile at break to average elongation at break $\leq 1.45$.

10. A bookbinding adhesive consisting essentially of 45 to 65 weight percent of an ethylene alkyl acrylate copolymer material having a melt index of 200 to 600 wherein said bookbinding adhesive has a viscosity of 2,000 to 8,000 cps at 177° C.

11. A bookbinding adhesive in accordance with claim 10 wherein said ethylene alkyl acrylate copolymer material is comprised of at least one component selected from the group consisting of ethylene methyl acrylate, ethylene ethyl acrylate, and ethylene butyl acrylate.

12. A bookbinding adhesive in accordance with claim 11 wherein said ethylene alkyl acrylate copolymer material has an alkyl acrylate content of 23 to 38 mole percent.

13. A bookbinding adhesive in accordance with claim 12 comprised of 50 to 60 weight percent of ethylene methyl acrylate copolymer material having a melt index of 270 to 450 with a methyl acrylate content of 25 to 35 mole percent.

14. A bookbinding adhesive in accordance with claim 13 further comprised of 25 to 35 weight percent of a tackifier and 10 to 20 weight percent of a wax.

15. A bookbinding adhesive comprised of 45 to 65 weight percent of an ethylene alkyl acrylate copolymer material having a melt index of 200 to 600 wherein said bookbinding adhesive has a viscosity of 2,000 to 8,000 cps at 177° C. and a ratio of average tensile at break to average elongation at break $\leq 1.45$.

16. A bookbinding adhesive in accordance with claim 1 wherein the first ethylene unsaturated ester copolymer material is comprised of an ethylene alkyl acrylate copolymer material having an alkyl acrylate content of 20 to 45 mole percent.

17. A bookbinding adhesive in accordance with claim 1 wherein the second ethylene unsaturated ester copolymer material is comprised of an ethylene vinyl acetate copolymer material having a vinyl acetate content of 20 to 50 mole percent and an ethylene alkyl acrylate copolymer material having an alkyl acrylate content of 20 to 45 mole percent.

18. A bookbinding adhesive in accordance with claim 17 further comprised of 25 to 45 weight percent of a tackifier and 10 to 20 weight percent of a wax.

19. A bookbinding adhesive comprised of 30 to 50 weight percent of an ethylene unsaturated ester copolymer component comprised of 15 to 50 weight percent of a first ethylene unsaturated ester copolymer material having a melt index of 1 to 30 and 50 to 85 weight percent of a second ethylene unsaturated ester copolymer material having a melt index of 150 to 600 wherein said bookbinding adhesive has a viscosity of 2,000 to 8,000 cps at 177° C. and a ratio of average tensile at break to average elongation at break $\leq 1.45$.

20. A bookbinding adhesive consisting essentially of 40 to 65 weight percent of an ethylene vinyl acetate copolymer material having a melt index $>400$ and $\leq 600$ and vinyl acetate content of 29 to 50 mole percent wherein said bookbinding adhesive has a viscosity of 2,000 to 8,000 cps at 177° C.

21. A bookbinding adhesive in accordance with claim 20 wherein said ethylene vinyl acetate copolymer material is present at 50 to 60 weight percent and has a melt index of 425 to 550 and a vinyl acetate content of 23 to 38 mole percent.

22. A bookbinding adhesive in accordance with claim 21 further comprised of 25 to 35 weight percent of a tackifier and 10 to 20 weight percent of a modifier.

23. A bookbinding adhesive comprised of 40 to 65 weight percent of an ethylene vinyl acetate copolymer material having a melt index $>400$ and $\leq 600$ and vinyl acetate content of 29 to 50 mole percent wherein said bookbinding adhesive has a viscosity of 2,000 to 8,000 cps at 177° C. and a ratio of average tensile at break to average elongation at break $\leq 1.45$.

* * * * *